United States Patent [19]

Basile et al.

[11] Patent Number: 5,543,071
[45] Date of Patent: Aug. 6, 1996

[54] COMPOSITIONS CONSISTING OF HYDROGENATED FLUOROCARBONS

[75] Inventors: Giampiero Basile; Ezio Musso, both of Alessandria, Italy

[73] Assignee: Ausimont S.P.A., Milan, Italy

[21] Appl. No.: 523,306

[22] Filed: Aug. 28, 1995

Related U.S. Application Data

[63] Continuation of Ser. No. 222,647, Apr. 4, 1994, abandoned.

[30] Foreign Application Priority Data

Apr. 5, 1994 [IT] Italy .................................. MI93A0658

[51] Int. Cl.$^6$ .................................................. C09K 5/04
[52] U.S. Cl. .................. 252/67; 62/114; 252/305
[58] Field of Search .................. 252/67, DIG. 9, 252/305; 62/114

[56] References Cited

U.S. PATENT DOCUMENTS

| | | | |
|---|---|---|---|
| 4,174,295 | 11/1979 | Bargigia | 252/305 |
| 4,303,536 | 12/1981 | Orfeo et al. | 252/67 |
| 4,482,465 | 11/1984 | Gray | 252/67 |
| 4,954,289 | 9/1990 | Barllett et al. | 252/305 |
| 5,151,207 | 9/1992 | Goble | 252/67 |
| 5,188,749 | 2/1993 | Crooker | 252/67 |

FOREIGN PATENT DOCUMENTS

| | | |
|---|---|---|
| 0299614 | 1/1989 | European Pat. Off. . |
| 0404086 | 12/1990 | European Pat. Off. . |
| 0568115 | 11/1993 | European Pat. Off. . |
| 3168262 | 7/1991 | Japan . |
| 3276052 | 12/1991 | Japan . |
| 2228739 | 9/1990 | United Kingdom . |

OTHER PUBLICATIONS

Database Energy, U.S. Department of Energy OSTI abstract, "Bubble Point Pressures for Chlorodifuloromethane + . . . ", Mishima, Kenji, Hongo, Masaru, et al. *J. Chem. & Eng. Data* pp. 49–52 Jan. 1993.

Database Energy, U.S. Department of Energy OSTI abstract, "Predicition of the Heat Transfer characteristics of R–22/R–152A/R–114 and R–22/R–152A/R–124 ", Schnotale, J. ASHRAE Transactions vol. 98 pt 2 1992, no month available.

Derwent abstract, AN 86–024363, abstract for JP–A–60 245 686 Dec. 1985.

Derwent abstract AN 91–257284, abstract for JP–A–3–168263 Jul. 1991.

European Search Report, dated Jun. 1, 1994 of EP 94 10 4686.

*Primary Examiner*—Linda Skaling Therkorn
*Attorney, Agent, or Firm*—Bryan Cave LLP

[57] ABSTRACT

Nearly azeotropic compositions consisting of hydrogenated fluorocarbons, suitable as freezing mixture in conditioning plants, essentially consisting of:

(A) from 38 to 53% by weight of R22;

(B) from 34 to 56% by weight of R124 and/or R124A;

(C) from 2 to 13.5% by weight of R600 and/or R600A.

12 Claims, No Drawings

COMPOSITIONS CONSISTING OF HYDROGENATED FLUOROCARBONS

This is a continuation of U.S. patent application Ser. No. 08/222,647, filed Apr. 4, 1994, now abandoned.

The present invention relates to mixtures utilizable in refrigerating circuits working according to Rankine cycle, particularly in refrigerating circuits working in motor-vehicles provided with air conditioning.

As it is known, R12 (dichlorodifluoromethane) is up to now the most used refrigerant for these applications. One has, however, to bear in mind that the production of this product will be put aside, as well known, owing to the law in force (Protocol of Montreal and its subsequent modifications) with different modalities and times for all applications due to its high destroying potential as to the ozone present in the stratosphere.

HFC 134a (1,1,1,2-tetrafluoroethane) has been proposed in the art as its substitute. The use of this product, however, assumes a new planning of the system working with R12 and also the utilization of another type of lubricating oil. The oil traditionally used with R12 is of naphthenic type, while the one required by HFC 134a belongs to the class of polyalkyleneglycols. The two lubricants are not compatible and moreover chlorine traces deriving from the decomposition of R12 irreparably damage the lubricants of the polyalkyleneglycol type.

Therefore in the existing equipment utilizing R12, it will be no longer possible to carry out the filling up of the refrigerant, which is necessary owing to the unavoidable losses. As such equipment is considered it might be still used for many years, it is desirable to find a solution allowing its utilization.

It should therefore be necessary to find a substitute, bearing in mind that this must not virtually require any kind of modification of elements, materials and, in general, components of the system in which it comes to work. In practice this solution is known in the art as "drop in".

The present invention puts itself in the "drop in" area, providing only for the replacement of the refrigerant R12 and utilizing the existing equipment relating to the average refrigeration, in particular the one of vehicles endowed with air conditioning.

One of the basic problems of the equipment for the field of motor-vehicles conditioning is the one of freezing gas losses. This problem, common to all refrigerating systems at average or high pressure, results indeed particularly heavy in the specific case of motor-vehicles conditioning.

It is known in the art also the use of freezing mixtures consisting of fluorocarbons. However if the refrigerant is an ordinary mixture, there is fractionation in the passage from the liquid phase to the gaseous one and in case of loss one or more components are preferably lost, whereby the subsequent filling up cannot be made with the original mixture and before carrying out the filling up itself it is necessary to establish the exact composition of the remained mixture. This because one, in practice, does not know where the loss occurs; the component or components which are lost could be the most volatile ones or the less volatile ones.

If the mixture contains a flammable component and a loss occurs, the evaporated gas can become rich of such flammable gas so as to reach the inflammability limit in the gaseous phase. Similarly, if the unflammable component is lost, the flammable component concentrates in the liquid, giving rise to a flammable liquid.

Moreover, if any not azeotropic mixture is used and considerable fractionation in the passage from the liquid state to the gaseous one and viceversa is obtained, with remarkable variation of the condensation or evaporation temperature during the state passage, then the efficiency of the traditional exchangers working on a Rankine cycle can considerably decrease compromising the efficiency of the whole circuit.

In the art it has been suggested to employ azeotropic or nearly azeotropic mixtures obviating the indicated drawbacks. For instance, it has been suggested to use as substitute for R12 in the refrigerating field the mixture R22 (chlorodifluoromethane)+R124 (1-chloro- 1,2,2,2-tetrafluoroethane) +R152a (1,1-difluoroethane) in certain ratios by weight, described in EP patent 299614, in order to obtain a nearly azeotropic mixture.

The use of mixtures of this type in the refrigeration has however the inconvenience, to require the use of a particular lubricating oil different from the one used with R12. The oil required by these mixtures is of alkylbenzenic type incompatible with the naphtenic oil used with R12.

This fact requires operations of complete emptying, accurate washings and dryings before feeding the mixture and the corresponding oil. Such a solution is not therefore "drop in" in the above reported meaning.

The Applicant has unexpectedly and surprisingly found nearly azeotropic compositions overcoming all the cited inconveniences and at the same time having the advantages of the flexibility typical of mixtures, as specified further on.

It has been possible to solve the given problem through a refrigerating mixture consisting essentially of a nearly azeotropic mixture in suitable concentrations of R22 (chlorodifluoromethane), R124 (1-chloro-1,2,2,2-tetrafluoroethane) and/or R124a (1-chloro-1,1,2,2-tetrafluoroethane), R600 (n-buthane) and/or R600a (isobutane). This is a "drop-in" mixture for R12, particularly useful in the motor-vehicles conditioning field, unflammable and nearly azeotropic, due to the fact that fractionation is very limited, with environmental impact undoubtedly lower than in the case of R12 and with the very important property of a very good compatibility with the mineral lubricating oils contained in the presently used refrigerating circuits working with R12.

In other words, the mixtures according to the present invention are quite interchangeable with R12 without the need of replacing the lubricating oil. Moreover said mixtures are not flammable and, even though they contain a flammable component, they do not give rise to flammable liquids or vapours owing to unavoidable losses from the circuit.

As nearly azeotropic mixture according to the present invention it is meant a mixture which, by working at atmospheric pressure, shows an increase in the boiling temperature lower than 10° C. with respect to the initial boiling temperature when all the liquid has evaporated. The nearly azeotropic mixtures according to the present invention essentially contain, by weight, from 2 to 13.5% of R600 and/or R600a, from 34 to 56% of R 124 and/or R124a and from 38 to 53% of R22, being 100 the sum of the three percentages. Preferred mixtures contain from 8 to 11% of R600 and/or R600a, from 43 to 45% of R124 and/or R124a and from 43 to 47% of R22; preferred are also the mixtures wherein the component b) is R124 and component c) is R600; more preferred are the mixtures in which R124 is present together with R124a, the last one preferably in amount comprised between 1 and 10% of the sum of R124 and R 124a, more preferably equal to 5% of said sum; even more preferred are the last mentioned mixtures when they contain R600 in an amount comprised between 1 and 30% by weight of the sum of R 600 and R600a.

The mixtures according to the present invention, being formed by more refrigerants, have some advantages, both as they take advantage of the characteristics of different components, comprised the ones having negative properties as inflammability, and as they are very flexible and they answer better than a sole component product to the thermodynamic and thermophysical characteristics to be obtained for a given design of the refrigerating circuit. Therefore, the mixtures according to the invention have shown to be, unexpectedly, quite "drop in" in place of R12.

As it is well known and particularly according to the invention, as refrigerating circuit one means the essential part of an apparatus which takes advantage of the state passage of a refrigerant to remove heat fron one side and give it to the other side, obtaining a continuous heat transfer. Consumed energy is the amount necessary to let the refrigerant circulate through the compressor to the condenser and the evaporator, which are just the exchangers inside of which the state passages occur at virtually constant temperature and pressure.

The refrigerant itself has intrinsic thermodynamic characteristics summarizable in the Efficiency (COP, Coefficient of Performance), in the Refrigerating Volumetric Capacity and in the Condensation and Evaporation Temperature and Pressure values.

Another very important and intrinsic characteristic of the refrigerant is connected with the gas heating during the compression phase. Such heating from one side can endanger the chemical stability of the refrigerant itself, from the other side it damages the energetic efficiency of the refrigerating cycle because the gas must then be cooled to the condenser temperature with waste of energy. Also important is the pressure at the outlet of the compressor which must be not too high with regard to the design data relative to the condenser and, in general, to the circuit part working at high pressure.

Also the properties of heat transmission through the inner surfaces of the exchangers are important intrinsic characteristics of the circulating fluid which comprises the lubricant and which in the motor-vehicle conditioning circuits circulates in a not negligible amount also inside the condenser. Heat exchangers (evaporator and condenser) are generally studied for a state passage at constant temperature and pressure. Their design in order to obtain the purpose of heat transfer with the utmost efficiency is therefore as important as the transmission properties of the circulating fluid.

All these elements work together to the overall efficiency of the circuit. The mixtures according to the present invention resulted to meet the various requirements in the best way, as optimum balancing of all properties.

The mixtures according to the invention have also the advantage to show a ODP value (Ozone Depleting Potentiality) lower than 0.03. Such a value is very low and comparable, or even better, than the one of other known mixtures, which however have the drawback not to be "drop in", as already said.

Surprisingly the mixtures of the invention, besides a very good ODP value, also show a better mixability with the mineral oils used with R12 in comparison with other known mixtures, so reaching the "drop in" standard with respect to R12.

Another advantage of the mixtures of the invention is to have a lower cost than the one of all known mixtures in the art as substitutes for R12. This advantage is not damaged by the inflammability property of the pure hydrocarbon, thanks to the concentrations utilized in the invention ensuring the non inflammability of the mixtures themselves.

Moreover, thanks to the nearly azeotropic behaviour of said mixtures, they never fractionate enough into liquids or flammable vapours, even in consequence of a very significant evaporation, higher than 50% by weight. The non flammability characteristics have been determined according to ASTM E-681 standard.

Another advantage of the compositions according to the present invention is that the hydrocarbon is available in high amounts, while the fluorocarbons used in the art as substitutes for R12 are obtainable with expensive processes of high technology and presently are of a very limited availability. The present invention is therefore considerably advantageous from an industrial point of view.

Still another advantage offered by the mixtures of the invention is that once dissolved in mineral oil, their prolonged contact also at high temperatures with metals, that usually are part of the circuit for the motor-vehicles conditioning, does not cause decomposition and/or chemical or physical attack to any component more than it occurs for R12. The tests have been carried out according to the standard described by the method ASHRAE 97-1983 (RA 89).

Moreover the permeability of the mixtures of the invention through the pipes at high pressure of the circuit for the motor-vehicles conditioning is not higher than the one shown by R12 under the same conditions.

The mixtures of the invention, moreover, surprisingly reproduce the pressure exerted by R12 in the temperature range 0°–100° C. with a maximum variance in absolute value of 25%.

The under reported examples are given only for illustrative but not limitative of the purpose of the present invention.

EXAMPLE 1

There has been characterized from the azeotropic behaviour aspect the mixture formed by R22/R124/R600a in which R22, R124 and R600a are in the % by weight ratio 47.5/43.7/8.8. The general characteristics of such mixture are reported in Tab. 1, where they are compared with the ones of a typical mixture of the art and with the ones of R12.

TABLE 1

|  | R22/R124/R600a 47.5/43.7/8.8 % b.w. | R22/R124/R152a 30/47/23 % b.w. | R12 |
| --- | --- | --- | --- |
| $T_{b.p.}$ (°C.) | −36 | −29 | −29.8 |
| Toxicity (ppm by weight) | 800 | 800 | 1000 |
| ODP | <0.15 | 0.16 | 1 |
| Inflammability | no | no | no |

The mixture having the indicated composition was charged in weighed amount in a pressure-tight cell having the volume of 550 ml, filling it 80% by volume. The cell was equipped for the measurement of the pressure exerted by the fluid and for the temperature survey.

The fluid contained in the cell was then evaporated very slowly by blowing off the vapour in equilibrium with the liquid till to obtain an amount of the fluid contained in the cell exactly equal to the half of the one initially charged. As during the operation the fluid tends to modify its temperature, the cell was thermostated so that the temperature of the liquid contained in the cell was constantly of 22° C. The drop of pressure in percentage with respect to the value of the initial pressure Pi was then registered and indicated as DP/Pi % (−50% b.w.). Such a value for a nearly azeotrope must be the lowest as possible, considering that in the case of a real azeotrope it comes much near to zero.

A mixture of the same composition was then charged in the same cell with the filling modalities above indicated. In this case the temperature of the thermostat was adjusted so that the pressure inside the cell was 1.25 ata. The fluid was then completely blown off by progressively rising the temperature of the cell in order to maintain the value of the pressure constant at 1.25 ata. It was then registered the value of DT measured under these conditions. The experiment was repeated a second time at an higher pressure level (12.5 atm), by registering also this time the temperature variation. The so determined values, reported in table 2, are significatively characterizing of the nearly azeotropic behaviour of the mixture.

TABLE 2

|  | R22/R124/R600a 47.5/43.7/8.8 % b.w. | R22/R124/R152a 30/47/23 % b.w. |
|---|---|---|
| DP/Pi % (−50% b.w.) | 10.9 | 9.7 |
| T = 22° C. | | |
| P = 1.25 ata | DT = +8.5° C. | DT = +7.2° C. |
| P = 12.5 ata | DT = +7.0° C. | DT = +6.5° C. |

EXAMPLE 2

A mixture having the composition R22/R124/R600=48.4/43/8.6% b.w. has been submitted to the solubility test with the naphthenic mineral oil usually utilized in circuits for motor-vehicles conditioning in order to locate the solubility fields in relation to temperature. In the test, it is defined for each oil concentration in the refrigerant, a critical solubility temperature above which the solubility between the two components is achieved.

In order to carry out the test, 1 g of oil was added to 8 g of cold freezing mixture (T=−30° C.) in a cold glass container at the same temperature and with such thick walls as to resist to the pressure. The glass container was then flame sealed.

The oil/refrigerant mixture contained in the test tube was then immersed in a glass thermostat quite thermostated. The temperature was first risen to the 65° C. value and then slowly reduced till one observed a cloud: such a temperature was registered as critical T (cloudy point) of the system. By further reducing the temperature, the cloud became more intense and at 2°–3° C. lower than the critical value, the phase separation clearly appeared with the classic meniscus of separation of two fluids. The registered data are reported in Tab. 3. One observes that the temperature field in which the mixture claimed works in homogeneous conditions (perfect solubility) is rather wide and quite capable to adapt to the requirements of the traditional refrigerating circuits for the motor-vehicles conditioning working with R12 (−10°/+90° C.) even though the critical temperature determined with the same oil for the mixture oil/R12 is even lower. A mixture of the art, reported for comparison in the same table, shows on the contrary the typical incompatibility with the mineral oil characterizing it as non "drop in".

TABLE 3

|  | R22/R124/R600 48.4/43/8.6 % b.w. | R22/R124/R152a 30/47/23 % b.w. | R12 |
|---|---|---|---|
| Critical T (°C.) | −17 | >+55 | <−60 |

The positive synergistic effect observed for this very important characteristic, due to the addition of hydrocarbon R600 to the mixture R22/R124, is absolutely surprising and unexpected. The solubility tests relative to the components of the mixture are reported in Tab. 4.

TABLE 4

|  | R22 | R124 | R22/R124 52.5/47.5 % b.w. | R22/R124/R600 48.4/43/8.6 % b.w. |
|---|---|---|---|---|
| Critical T (°C.) | +12 | +53 | +28.8 | −17 |

From the examination of the values reported in Tab. 3 it appears that the replacement of R152a with R600 brings a decisive advantage to the claimed mixture R22/R124/R 600 allowing it an undoubtedly superior working field.

EXAMPLE 3

The mixture R22/R124/R600a=48.4/43/8.6% b.w. has been submitted to the chemical stability test described in the method ASHRAE 97-1983 (RA 89) with some differences reported hereunder.

In a glass tube having a volume of about 10 cm$^3$, two metal coupon (copper and steel) and about 1 ml of the same naphthenic mineral oil used in Example 2 have been put. The glass pipe (d=3 mm, h=30 mm) has then been adapted to the inside of a steel cylinder fit to exactly contain it. Above the cylinder a manual valve capable to exert a sufficient pressure sealing has been screwed. At open valve the vacuum inside the tube was set. It was then cooled in a thermostated liquid at a T<−30° C. and connected for the filling with the freezing mixture also cooled at the same temperature. By quickly charging of about 1 ml of refrigerant and by closing the valve as soon as possible, the closed tube was put in a thermostated stove and left here for a period of time of 14 days at 175° C. together with other two samples which have been prepared in the same way, by only changing the type of refrigerant, that is by putting in a second tube R12 and in a third one the mixture R22/R124/R152a=30/47/23% b.w.

Once 14 days have elapsed, the test tubes have been opened and the refrigerant let evaporate inside a sample-holder for the gaschromatographic analysis of the refrigerant together with possible light products of decomposition of the mineral oil.

The oil of the three samples has then been submitted to analysis for the acidity determination and to visual analysis of the coloring change.

The metal coupon have been observed in order to see the presence of initial corrosions and the steel ones to reveal the possible phenomenon of "copper plating". The quality of the refrigerating/oil/metals system was construed for each parameter with a scale from 0 to 8 (from no effect to marked effect), with this scale meaning a decomposition phenomenon from null to significant, identified as coloring and/or acidity and/or by-products and/or copper plating. The results are reported in Table 5.

TABLE 5

|  | R22/R124/R600a 48.4/43/8.6% b.w. | R22/R124/R152a 30/47/23% b.w. | R12 |
|---|---|---|---|
| H$_2$O content (ppm b.w.) | <30 | <30 | <30 |
| Oil colour | 2 | 2 | 8 |
| Acidity | 0 | 0 | 4 |
| By-products (gas) | 0 | 0 | 4 |
| Corrosion | 0.5 | 0.5 | 2 |
| Copper plating | 0.5 | 0.5 | 2 |

EXAMPLE 4

The two mixtures of composition R22/R124/R600 a=51.9/34.6/13.5 and R22/R124/R600a=38.4/48.1/13.5, containing the maximum amount of flammable hydrocarbon in the two extreme conditions of the ratio R22/R124, have been submitted to the inflammability test for each of the two phases, liquid and vapour, by following the modalities described in the standard ASTM E-681. None of the four samples appeared flammable.

Moreover, each mixture of them, after having been put in a 500 cm$^3$ cylinder, has been let evaporate at air till each mixture has lost the 50% and the 90% of the initial liquid. Four liquids and four vapours have been obtained, so simulating the effect that one would have in consequence of a loss from stocking containers or from feeding lines, by releasing potential flammable vapours or possible flammable liquids. The eight samples have been submitted to the inflammability test, all resulting uninflammable.

We claim:

1. A refrigerant composition consisting essentially of:
   (a) chlorodifluoromethane in an amount from 38% to 53% by weight of the composition;
   (b) a compound selected from the group consisting of 1-chloro-1,2,2,2,-tetrafluoroethane, 1-chloro- 1,1,,2,2-tetrafluoroethane, and mixtures thereof, the compound being present in an amount from 34% to 56% by weight of the composition;
   (c) a butane selected from the group consisting of n-butane, isobutane, and mixtures thereof, the butane being present in an amount from 2% to 13.5% by weight of the composition;
   the composition having the property that it shows an increase in its boiling point at atmospheric pressure of less than 10° C. with respect to its initial boiling point when all the composition is evaporated; the composition further having an Ozone Depletion Potentiality lower than 0.03;
   wherein the composition is a drop-in replacement for dichlorodifluoromethane for use in a refrigeration circuit designed for use with dichlorodifluoromethane.

2. The composition of claim 1, wherein component (a) is from 43% to 47% by weight, component (b) is from 43% to 45% by weight, and component (c) is from 8% to 11% by weight.

3. The composition of claim 2 wherein component (b) is 1-chloro-1,2,2,2-tetrafluoroethane, and component (c) is n-butane.

4. The composition of claim 1 wherein component (b) contains 1-chloro-1,1,2,2-fluoroethane in an amount from 1% to 10% by weight with respect to the weight of component (b).

5. The composition of claim 4 wherein component (b) contains 1-chloro-1,1,2,2-fluoroethane in an amount of 5% by weight with respect to the weight of component (b).

6. The composition of claim 4 wherein component (c) contains n-butane in an amount from 1% to 30% by weight with respect to the weight of component (c).

7. A method of refrigeration comprising circulating the composition of claim 1 through a compressor in a refrigeration circuit working according to a Rankine cycle.

8. The method of claim 7, wherein the refrigeration circuit is contained in a motor vehicle.

9. A method of replacing dichlorodifluoromethane in a refrigeration circuit working according to a Rankine cycle consisting essentially of: (1) removing any dichlorodifluoromethane remaining in the refrigeration circuit, and (2) adding the composition of claim 1 as a drop-in replacement for the dichlorodifluoromethane in the refrigeration circuit without modifying the refrigeration circuit.

10. The method of claim 9, wherein the refrigeration circuit is contained in a motor vehicle.

11. A method of refrigeration in which the composition of claim 1 is placed in a refrigeration circuit designed to work according to the Rankine cycle with dichlorodifluoromethane as the refrigerant, and the refrigeration circuit is then operated according to the Rankine cycle.

12. The method of claim 11, wherein the refrigeration circuit is contained within a motor vehicle.

* * * * *

UNITED STATES PATENT AND TRADEMARK OFFICE
CERTIFICATE OF CORRECTION

PATENT NO. : 5,543,071
DATED : August 6, 1996
INVENTOR(S) : Giampiero Basile et al.

It is certified that error appears in the above-indentified patent and that said Letters Patent is hereby corrected as shown below:

On the title page, under Foreign Application:

Priority Data: Delete "Apr. 5, 1994" Insert --Apr. 5, 1993--.

Signed and Sealed this

Fifth Day of November, 1996

Attest:

BRUCE LEHMAN

Attesting Officer     Commissioner of Patents and Trademarks